United States Patent
Kim et al.

(10) Patent No.: US 9,290,845 B2
(45) Date of Patent: Mar. 22, 2016

(54) STAINLESS STEEL FOR POLYMER FUEL CELL SEPARATOR AND METHOD FOR PREPARING SAME

(75) Inventors: Jonghee Kim, Pohang-si (KR); Kihoon Jo, Pohang-si (KR); Younghwan Kim, Pohang-si (KR); Jeonghe Lee, Pohang-si (KR); Yunyong Lee, Pohang-si (KR); Jinsuk Kim, Pohang-si (KR); Jongheon Seok, Pohang-si (KR)

(73) Assignee: POSCO, Pohang-Si, Gyeongsankbuk-Do (KR)

( * ) Notice: Subject to any disclaimer, the term of this patent is extended or adjusted under 35 U.S.C. 154(b) by 1012 days.

(21) Appl. No.: 13/142,495

(22) PCT Filed: Dec. 29, 2009

(86) PCT No.: PCT/KR2009/007891
§ 371 (c)(1),
(2), (4) Date: Aug. 12, 2011

(87) PCT Pub. No.: WO2010/077065
PCT Pub. Date: Jul. 8, 2010

(65) Prior Publication Data
US 2011/0294042 A1     Dec. 1, 2011

(30) Foreign Application Priority Data

Dec. 29, 2008  (KR) .................. 10-2008-0135141
Dec. 18, 2009  (KR) .................. 10-2009-0127397

(51) Int. Cl.
*H01M 2/16*     (2006.01)
*C22C 38/16*    (2006.01)
(Continued)

(52) U.S. Cl.
CPC .............. *C23C 22/34* (2013.01); *C22C 38/001* (2013.01); *C22C 38/004* (2013.01);
(Continued)

(58) Field of Classification Search
CPC .............. C23C 8/80; C23C 26/00; C23C 8/18
USPC ................................. 148/276, 277, 287; 420/8
See application file for complete search history.

(56) References Cited

U.S. PATENT DOCUMENTS 6,379,476 B1    4/2002 Tarutani et al.
2002/0160248 A1  10/2002 Takao et al.
(Continued)

FOREIGN PATENT DOCUMENTS

CN    1271027 A    10/2000
JP    6-146006     5/1994
(Continued)

OTHER PUBLICATIONS

International Search Report from the Korean Patent Office for International Application No. PCT/KR2009/007891, mailed Aug. 13, 2010.
(Continued)

*Primary Examiner* — Jun Li
*Assistant Examiner* — Jenny Wu
(74) *Attorney, Agent, or Firm* — Finnegan Henderson Farabow Garrett & Dunner LLP (57) ABSTRACT

There are provided a ferrite stainless steel for a polymer fuel cell separator having excellent corrosion resistance and interfacial contact resistance under an operating environment of a polymer fuel cell, and a preparation method of the stainless steel. A stainless steel includes C: 0.02 wt % or less, N: 0.02 wt % or less, Si: 0.4 wt % or less, Mn: 0.2 wt % or less, P: 0.04 wt % or less, S: 0.02 wt % or less, Cr: 25.0 to 32.0 wt %, Cu: 0 to 2.0 wt %, Ni: 0.8 wt % or less, Ti: 0.5 wt % or less, Nb: 0.5 wt % or less, waste Fe and inevitably contained elements. A preparation method of the stainless steel having a second passive film formed on a surface thereof includes forming a first passive film on the surface of the stainless steel by brightannealing or annealing-pickling the stainless steel; removing the first passive film by pickling the stainless steel in a 10 to 20 wt % sulfuric acid solution at a temperature of 50 to 75° C. for a predetermined time; water-washing the stainless steel; and forming the second passive film by performing a passivation treatment on the stainless steel in the mixture of a 10 to 20 wt % nitric acid and a 1 to 10 wt % fluorine acid at a temperature of 40 to 60° C. for the predetermined time. Accordingly, it is possible to prepare a stainless steel having reduced elution resistance and excellent corrosion resistance and to produce a stainless steel for a polymer fuel cell separator, which has low interfacial contact resistance and excellent long-term performance even under a fuel cell operating condition of 60 to 150° C. and various surface roughness conditions.

20 Claims, 8 Drawing Sheets

(51) Int. Cl.

| | | |
|---|---|---|
| *C23C 22/34* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C23C 8/02* | (2006.01) | |
| *C23G 1/08* | (2006.01) | |
| *H01M 8/02* | (2006.01) | |
| *H01M 8/10* | (2006.01) | |

(52) U.S. Cl.
CPC ............ *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C23C 8/02* (2013.01); *C23G 1/081* (2013.01); *H01M 8/021* (2013.01); *H01M 2008/1095* (2013.01); *Y02E 60/50* (2013.01)

(56) References Cited

U.S. PATENT DOCUMENTS

| | | |
|---|---|---|
| 2006/0105218 A1 | 5/2006 | Ishikawa et al. |
| 2008/0233456 A1 | 9/2008 | Ishikawa et al. |
| 2010/0132842 A1 | 6/2010 | Lee et al. |

FOREIGN PATENT DOCUMENTS

| | | |
|---|---|---|
| JP | 09-157801 | 6/1997 |
| JP | 2000-323152 | 11/2000 |
| JP | 2003-223904 | 8/2003 |
| JP | 2004-149920 | 5/2004 |
| JP | 2004-232074 | 8/2004 |
| JP | 2005-213539 | 8/2005 |
| JP | 2005-293982 | 10/2005 |
| JP | 2005-302713 | 10/2005 |
| JP | 2006-009056 | 1/2006 |
| JP | 2006-206947 | 8/2006 |
| JP | 2007-026694 | 2/2007 |
| JP | 2008-91225 | 4/2008 |
| JP | 2010-514930 | 5/2010 |
| KR | 10-2000-0071568 | 11/2000 |
| KR | 10-0488922 | 5/2005 |
| KR | 10-2006-0123779 | 12/2006 |
| WO | WO 2008082162 A1 * | 7/2008 |

OTHER PUBLICATIONS

Patent Gazette issued on Mar. 19, 2014 in related Chinese Patent Application No. ZL200980153305.3, 3 pages.

English translation of First Office Action issued Nov. 5, 2012, from the State Intellectual Property Office of the People's Republic of China in corresponding Chinese Pat. App. No. 200980153305.3 (10 pages total).

Notice of Allowance dated Oct. 29, 2010 in Korean counterpart application based on International Application No. PCT/KR2009/007891, 5 pages.

* cited by examiner

STAINLESS STEEL FOR POLYMER FUEL CELL SEPARATOR AND METHOD FOR PREPARING SAME

TECHNICAL FIELD

An aspect of the present invention relates to a stainless steel for a fuel cell separator and method of manufacturing the same. More particularly, an aspect of the present invention relates to a stainless steel for a fuel cell separator, which has low interfacial contact resistance and excellent corrosion resistance by setting surface reforming conditions so as to remove an passive film of the stainless steel and control repassivation treatment even under various surface roughness conditions, and a manufacturing method of the stainless steel.

BACKGROUND ART

In recent years, the energy depletion, the environmental pollution and the like have issued as global problems, and therefore, hydrogen energy and fuel cells using the hydrogen energy have been increasingly used as a substitute of fossil fuel. A fuel cell is a device that transforms chemical energy of hydrogen into electrical energy. Since the fuel cell does not use an internal-combustion engine, there is no noise and vibration, and high efficiency can be achieved. Since pollutants are hardly generated, the fuel cell has come into the spotlight as a new energy source.

Fuel cells may be divided into a solid polymer fuel cell, a solid oxide fuel cell, a molten carbonate fuel cell, a phosphoric acid fuel cell, a direct methanol fuel cell and an alkaline fuel cell depending on the kind of an electrolyte. The fuel cells may be used as those for power generation, transportation, portable purposes, and the like.

In the solid polymer fuel cell (polymer electrolyte membrane fuel cell, or PEMFC), a solid polymer membrane is used as an electrolyte, and hence the solid polymer fuel cell can operate at a normal temperature and pressure. Further, the solid polymer fuel cell has come into the spotlight as a power source because of a lower operating temperature of about 70 to 80° C., a short operating time and a high power density. Recently, a polymer fuel cell operable even at 100 to 150° C. has been under development.

Figure 1:
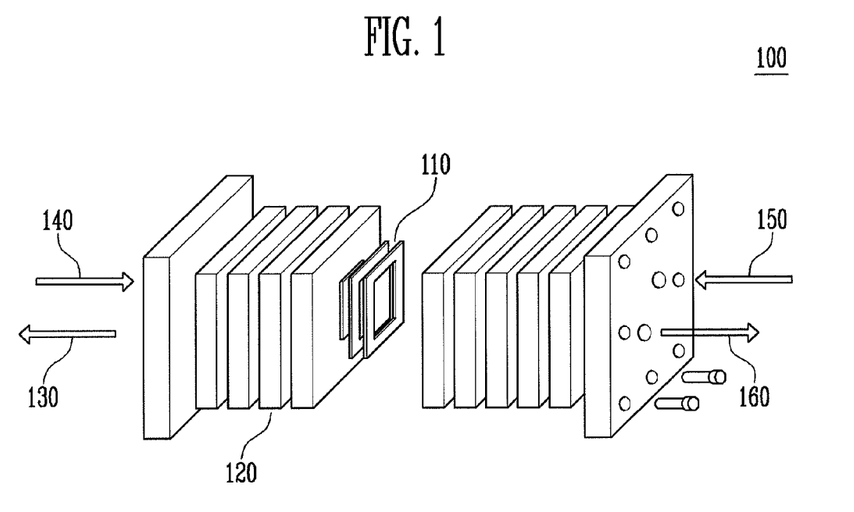
FIG. 1 is a perspective view of a fuel cell including a general stainless separator.

FIG. 1 is a perspective view of a fuel cell including a stainless steel separator.

Referring to FIG. 1, a solid polymer fuel cell stack 100 includes a membrane electrode assembly 110 including an electrolyte, electrodes (an anode and a cathode) and a gasket for gas sealing, a separator 120 having a flow channel, and an end plate including inlets and outlets 130 and 140 of air and inlets and outlets 150 and 160 of hydrogen gas.

The separator 120 is generally formed of any one of graphite, carbon, Ti alloy, stainless steel and conductive plastic. Preferably, the separator is formed of the stainless steel. The stainless steel has low interfacial contact resistance, excellent corrosion resistance, high heat conductivity, low gas transmittance. The stainless steel also has excellent mechanical strength and formability at a thin plate. Thus, the stainless steel has an advantage in that the volume and weight of the fuel cell stack can be reduced.

However, the separator 120 formed of the stainless steel has a problem in that the interfacial contact resistance between a material surface of the separator and a membrane electrode assembly (MEA) layer may be increased by semiconducting characteristics of an passive film formed on the surface of the separator 120 under fuel cell operating conditions. Further, the separator 120 requires excellent corrosion resistance in the fuel cell operating environmental atmosphere having a strong acidic atmosphere.

In order to solve such a problem, U.S. Pat. No. 6,835,487B2 and Korean Patent No. 0488922 disclose a method for obtaining surface characteristics of a stainless steel to a desired level by regulating the mean surface roughness Ra that shows a surface roughness to be 001 to 1.0 µm and regulating the maximum height Ry to be 0.01 to 20 µm so as to decrease the surface contact resistance of the stainless steel to 100 mΩcm² or lower. Here, the stainless steel contains Cr (16 to 45 wt %) and Mo (0.1 to 3.0 wt %) and additionally contains Ag (0.001 to 0.1 wt %). Japanese Laid-Open Publication No 2007-026694 discloses a method for obtaining surface characteristics of a stainless steel to a desired level by forming micro-pits of 0.01 to 1.0 µm on the entire surface of the stainless steel containing Cr and Mo. U.S. Pat. No. 6,379,476B1 discloses a method for preparing a ferritic stainless steel having a mean roughness of 0.06 to 5 µm by exposing carbide (carbide inclusion) and boride (boride inclusion) to a surface of the ferritic stainless steel. Here, the ferrite stainless steel contains 0.08% or more C for forming carbide. Japanese Laid-Open Publication No 2005-302713 discloses a technique for ensuring the locally calculated mean interval S=0.3 µm or less and the second-order mean-square slope Δq=0.05 or more in a stainless steel containing Cr (16 to 45 wt %) and Mo (0.1 to 5.0 wt %).

However, these methods are provided only for the purposes of decreasing contact resistance by regulating the surface roughness of the stainless steel, micro-pits or conductive inclusions. To this end, the surface roughness of the stainless steel should be strictly maintained. Therefore, productivity is lowered, and production cost is increased. Further, it is difficult to secure reproducibility. In these methods, a component containing Cr and Mo as essential elements is specified within a predetermined range, and Ag, C and B for forming other conductive inclusions are added as additional elements to the stainless steel. Therefore, the increase in preparation cost may be caused, and it is not necessary to ensure stability of contact resistance and elution resistance under the fuel cell operating condition (60 to 150° C.) in acidic environment.

Japanese Laid-Open Publication No 2004-149920 discloses a method for reducing contact resistance by regulating the Cr/Fe atomic ratio to be 1 or more in a stainless steel containing Cr (16 to 45 wt %) and Mo (0.1 to 5.0 wt %). Japanese Laid-Open Publication No 2008-091225 discloses a method for reducing contact resistance by forming micro-pits in a stainless steel containing Cr (16 to 45 wt %) and Mo (0.1 to 5.0 wt %) and by securing the Cr/Fe atomic ratio to be 4 or more.

However, these methods have difficulty in specifying a component containing Cr and Mo as essential elements and stably securing low interfacial contact resistance without ensuring a strict control process of a passive film even under conditions having various surface roughnesses. Further, it is not necessary to ensure stability of contact resistance and elution resistance under the fuel cell operating condition (60 to 150° C.) in an acidic environment.

DISCLOSURE OF INVENTION

Technical Problem

Accordingly, an object of the present invention is to provide a stainless steel for a polymer fuel cell separator having excellent long-term performance which can set surface reforming conditions so that it is possible to maintain excellent elution resistance and contact resistance even under a fuel cell operating environment of 60 to 150° C. in an acidic environment and to secure low interfacial contact resistance and corrosion resistance by controlling the removal of a passive film and repassivation treatment even under various surface roughness conditions, and a preparation method of the stainless steel.

Technical Solution

According to an aspect of the present invention, there is provided a stainless steel for a fuel cell separator, to which Mo is not added, the stainless steel comprising C: 0.02 wt % or less, N: 0.02 wt % or less, Si: 0.4 wt % or less, Mn: 0.2 wt % or less, P: 0.04 wt % or less, S: 0.02 wt % or less, Cr: 25.0 to 32.0 wt %, Cu: 0 to 2.0 wt %, Ni: 0.8 wt % or less, Ti: 0.5 wt % or less, Nb: 0.5 wt % or less, waste Fe and inevitably contained elements. In the stainless steel, a passive film formed on a surface of the stainless steel is formed to have a thickness of 2 to 4.5 nm, the Cr/Fe oxide ratio of the passive film is 1.5 or more in a region of 1.5 nm or less, and the $Cr(OH)_3$/Cr oxide distribution of the passive film has a ratio of 0 to 0.7 in a region of 1 nm.

The stainless steel may include Mo: 5.0 wt % or less.

The stainless steel may further include one or two or more elements selected from the group consisting of V: 0.1 to 1.5 wt %, W: 0.1 to 2.0 wt %, La: 0.0005 to 10 wt %, Zr: 0.0005 to 10 wt % and B: 0.0005 to 1.0 wt %.

The contact resistance of the stainless steel may be 10 $m\Omega cm^2$ or less.

According to another aspect of the present invention, there is provided a preparation method of a stainless steel for a polymer fuel cell separator, comprising C: 0.02 wt % or less, N: 0.02 wt % or less, Si: 0.4 wt % or less, Mn: 0.2 wt % or less, P: 0.04 wt % or less, S: 0.02 wt % or less, Cr: 25.0 to 32.0 wt %, Cu: 0 to 2.0 wt %, Ni: 0.8 wt % or less, Ti: 0.5 wt % or less, Nb: 0.5 wt % or less, waste Fe and inevitably contained elements, in which a second passive film is formed on a surface of the stainless steel to which Mo is not added, the method comprising: forming a first passive film on the surface of the stainless steel by bright-annealing or annealing-pickling the stainless steel; removing the first passive film by pickling the stainless steel in a 10 to 20 wt % sulfuric acid solution at a temperature of 50 to 75° C. for a time controlled based on a surface roughness Ra; water-washing the stainless steel; and forming the second passive film by performing a passivation treatment on the stainless steel in the mixture of a 10 to 20 wt % nitric acid and a 1 to 10 wt % fluorine acid at a temperature of 40 to 60° C. for the time controlled based on the surface roughness Ra.

In the removing of the first passive film, the stainless steel may be pickled for a processing time according to the following expression:

$$99-3.18(1/Ra) \leq \text{processing time}(t, \text{second}) \leq 153-3.18(1/Ra).$$

In the forming of the second passive film, the stainless steel may be subjected to the passivation treatment for a processing time according to the following expression:

$$120+6.73(1/Ra) \leq \text{processing time}(t, \text{second}) \leq 140+6.73(1/Ra).$$

The contact resistance of the stainless steel may be 10 $m\Omega cm^2$ or less under an operating environment of 60 to 150° C.

In the forming of the second passive film, the second passive film may be formed to have a thickness of 2 to 4.5 nm.

In the forming of the second passive film, the Cr/Fe oxide ratio of the second passive film may be 1.5 or more in a region of 1.5 nm or less.

In the forming of the second passive film, the $Cr(OH)_3$/Cr oxide distribution of the second passive film may have a ratio of 0 to 0.7 in a region of 1 nm.

Advantageous Effects

As described above, according to the present invention, surface reforming conditions are set so that it is possible to control the removal of a passive film of a stainless steel and repassivation treatment even under various surface roughness conditions. Thus, the stainless steel can secure low interfacial contact resistance and achieve excellent corrosion resistance with reduced elution resistance. Accordingly, it is possible to produce a stainless steel having excellent long-term performance of the polymer fuel cell.

BEST MODE

Hereinafter, a stainless steel for a fuel cell separator according to the present invention will be described in detail with reference to the accompanying drawings.

A general stainless steel for a fuel cell separator having various surface roughness conditions, such as a bright annealing material or annealing pickling material of a stainless steel cold-rolled material, has high contact resistance due to a passive film formed on a surface of the stainless steel after annealing and pickling the stainless steel, and the surface roughness conditions are partially changed due to friction between the surface and a mold in the molding process of a portion of the separator. Accordingly, an appropriate surface reforming treatment is preferably performed on the stainless steel for the separator so as to satisfy requirements of a separator having low contact resistance and improved corrosion resistance under various surface roughness conditions.

To this end, in the present invention, a stainless steel for a polymer fuel cell separator, which has low interfacial contact resistance and excellent corrosion resistance, and a preparation method of the stainless steel, will be described. A separator is stamed or hydro-formed using a stainless steel having various surface roughnesses. In order to remove a first passive film formed on the separator, the stainless steel is pickled in a 10 to 20 wt % sulfuric acid solution at a temperature of 50 to 75° C. under an optimum processing condition while maintaining an appropriate time depending on a surface roughness condition. After water-washing the stainless steel, a repassivation treatment of the stainless steel is performed in the mixture of a 10 to 20 wt % nitric acid and a 1 to 10 wt % fluoric acid at a temperature of 40 to 60° C. while maintaining an appropriate time depending on a surface roughness condition so as to form a second passive film. Accordingly, the thickness of the passive film formed on the surface of the stainless steel is formed to 2 to 4.5 nm, and the Cr/Fe oxide ratio is 1.5 or more in a region of less than 1.5 nm. Also, the Cr(OH)$_3$/Cr oxide ratio is 0 to 0.7 in a region of 1 nm, so that the contact resistance of the stainless steel can ensure 10 mΩcm$^2$ or less.

Hereinafter, the stainless steel for the polymer fuel cell separator, which has low interfacial contact resistance and excellent corrosion resistance, will be described in detail.

The stainless steel according to the present invention has a composition of elements including C: 0.02 wt % or less, N: 0.02 wt % or less, Si: 0.4 wt % or less, Mn: 0.2 wt % or less, P: 0.04 wt % or less, Cr: 25.0 to 32.0 wt %, Cu: 0 to 0.2 wt %, Ni: 0.8 wt % or less, and Ti: 0.5 wt % or less; one or two or more elements selected from the group consisting of V: 0 to 1.5 wt %, W: 0 to 2.0 wt %, La: 0 to 10 wt %, Zr: 0 to 1.0 wt % and B: 0 to 0.1 wt %; and waste Fe and inevitably contained elements. As described above, Mo is not added to the stainless steel according to the present invention.

Meanwhile, in a case where the Mo is added to the stainless steel, the content of the Mo is preferably 0.5 wt % or less.

A slab produced by steel making, refining and continuous casting an alloy with such a composition passes through processes of hot-rolling, annealing, pickling, cool-rolling, annealing and pickling, thereby preparing a cold-rolled product.

Hereinafter, the composition range and limitation reason of the present invention will be described in detail. The following percentages (%) are weight percentages in all cases.

C and N form a Cr carbon/nitride in the stainless steel. As a result, the corrosion resistance of a layer in which Cr is deficient is lowered, and therefore, both the elements are preferably contained as small as possible. Thus, in the present invention, their composition ratios are limited to C: 0.02% or less, and N: 0.02% or less, respectively.

Si is an element effective for deoxidation but constraints ductility and formability. Thus, in the present invention, the composition of the Si is limited to 0.4% or less.

Mn is an element that increases deoxidation, but MnS that is an inclusion decreases corrosion resistance. Thus, in the present invention, the composition ratio of the Mn is limited to 0.2% or less.

P decreases ductility in addition to corrosion resistance. Thus, in the present invention, the composition ratio of the P is limited to 0.04% or less.

S forms MnS, and the MnS becomes a starting point to decrease corrosion resistance. Thus, in the present invention, the composition ratio of the S is limited to 0.02% or less.

Cr increases corrosion resistance under an acidic atmosphere in which a fuel cell is operated. But Cr decreases ductility. Thus, in the present invention, the composition ratio of the Cr is limited to 25 to 32%.

Mo functions to increase corrosion resistance under the acidic atmosphere in which the fuel cell is operated. However, if the Mo is excessively added to the stainless steel, ductility is decreased, and the Mo is disadvantageous in terms of effect and economic efficiency. Thus, in the present invention, the Mo is not basically added to the stainless steel. The present invention can obtain a desired effect even when the Mo is not added to the stainless steel. In a case where it is particularly required to improve corrosion resistance, the Mo may be separately added to the stainless steel. In this case, the content of the Mo is preferably limited to the range of 5% or less.

Cu may increase corrosion resistance under the acidic atmosphere in which the fuel cell is operated, or the performance of the fuel cell and the formability of the stainless steel may be lowered due to the elution of the Cu and the effect of solid solution strength when the Cu is excessively added to the stainless steel. Thus, in the present invention, the composition ratio of the Cu is limited to the range from 0 to 2%.

Ni functions to decrease partial contact resistance, but the election of the Ni and the formability of the stainless steel may be lowered when the Ni is excessively added to the stainless steel. Thus, in the present invention, the composition ratio of the Ni is limited to 0.8% or less.

Ti and Nb are element effective for forming C and N as a carbon nitride in the stainless steel, but decrease ductility. Thus, in the present invention, the composition ratio of each of the Ti and Nb is limited to 0.5% or less.

In addition, one or two or more of V, W, La, Zr and B may be added to the stainless steel, and their composition ratios are as follows.

V increases corrosion resistance under the acidic atmosphere in which the fuel cell is operated, but the performance of the fuel cell may be lowered due to the elution of ions when the V is excessively added to the stainless steel. Thus, in the present invention, the composition ratio of the V is limited to 0.1 to 1.5%.

W increases corrosion resistance and decreases interfacial contact resistance under the acidic atmosphere in which the fuel cell is operated. However, when the W is excessively added to the stainless steel, tension is decreased. Thus, in the present invention, the composition ratio of the W is limited to 0.1 to 2.0%.

La may induce fine dispersion of a sulfide-based inclusion in the stainless steel and induce densification of a passive film. However, when the La is excessively added to the stainless steel, there occurs a problem of nozzle clogging, or the like. Thus, in the present invention, the composition ratio of the La is limited to 0.0005 to 1.0%.

Zr increases corrosion resistance under the acidic atmosphere in which the fuel cell is operated, but induces a surface defect when the Zr is excessively added to the stainless steel. Thus, in the present invention, the composition ratio of the Zr is limited to 0.0005 to 1.0%.

B forms a nitride in the stainless steel and improves its corrosion resistance. However, when the B is excessively added to the stainless steel, a surface defect is induced. Thus, in the present invention, the composition ratio of the B is limited to 0.0005 to 1.0%.

Hereinafter, a process of setting a processing condition for each surface roughness condition.

The compositions of stainless steels prepared in the present invention are shown in Table 1.

TABLE 1

| Kind of steel | C | Si | Mn | P | S | Al | Cr | Ni | Cu | Ti | Nb | Mo | Other | N |
|---|---|---|---|---|---|---|---|---|---|---|---|---|---|---|
| Invention steel 1 | 0.009 | 0.29 | 0.142 | <0.003 | <0.002 | 0.048 | 26.26 | 0.173 | 0.437 | 0.058 | 0.241 | 2.03 | — | 0.009 |
| Invention steel 2 | 0.007 | 0.273 | 0.146 | <0.003 | <0.002 | 0.058 | 26.33 | 0.167 | 0.436 | 0.059 | 0.25 | 4.04 | — | 0.009 |
| Invention steel 3 | 0.008 | 0.269 | 0.145 | <0.003 | <0.002 | 0.055 | 30.01 | 0.169 | 0.43 | 0.06 | 0.245 | 2.13 | — | 0.009 |
| Invention steel 4 | 0.006 | 0.293 | 0.143 | <0.003 | <0.002 | 0.041 | 30.29 | 0.168 | 0.4 | 0.046 | 0.242 | 4.03 | — | 0.008 |
| Invention steel 5 | 0.006 | 0.303 | 0.14 | <0.003 | <0.002 | 0.027 | 28.55 | 0.181 | 0.412 | 0.041 | 0.241 | 3.19 | — | 0.009 |
| Invention steel 6 | 0.008 | 0.341 | 0.146 | <0.003 | <0.002 | 0.039 | 30.66 | 0.181 | 0.442 | 0.041 | 0.245 | 2.03 | 0.0013La | 0.012 |
| Invention steel 7 | 0.008 | 0.307 | 0.14 | <0.003 | <0.002 | 0.03 | 29.68 | 0.19 | 0.421 | 0.039 | 0.24 | 2.12 | 0.420W | 0.008 |
| Invention steel 8 | 0.008 | 0.263 | 0.145 | <0.003 | <0.002 | 0.055 | 29.68 | 0.184 | 0.429 | 0.051 | 0.243 | 2 | 0.002Zr | 0.008 |
| Invention steel 9 | 0.007 | 0.24 | 0.151 | <0.003 | <0.002 | 0.041 | 30.42 | 0.185 | 0.964 | 0.05 | 0.247 | 2.03 | — | 0.009 |
| Invention steel 10 | 0.009 | 0.267 | 0.148 | <0.003 | <0.002 | 0.04 | 30.75 | 0.183 | 0.455 | 0.049 | 0.243 | 2.03 | 0.363V | 0.009 |
| Invention steel 11 | 0.007 | 0.308 | 0.15 | <0.003 | <0.002 | 0.021 | 30.42 | 0.183 | 0.442 | 0.036 | 0.24 | 2.01 | 0.001B | 0.008 |
| Invention steel 12 | 0.003 | 0.107 | 0.146 | 0.003 | <0.003 | 0.057 | 30.05 | 0.192 | 0.977 | 0.05 | 0.25 | 2 | 0.4W | 0.006 |
| Invention steel 13 | 0.004 | 0.199 | 0.153 | 0.003 | <0.003 | 0.043 | 30.1 | 0.193 | 1.01 | 0.045 | 0.25 | 1.98 | 0.41W | 0.007 |
| Invention steel 14 | 0.005 | 0.222 | 0.148 | 0.003 | <0.003 | 0.056 | 30.26 | 0.207 | 0.97 | 0.048 | 0.26 | 2.03 | 0.4V | 0.009 |
| Invention steel 15 | 0.005 | 0.162 | 0.152 | 0.003 | <0.003 | 0.946 | 29.96 | 0.747 | 0.975 | 0.052 | 0.26 | 2 | 0 | 0.005 |
| Invention steel 16 | 0.006 | 0.208 | 0.138 | 0.004 | <0.003 | 0.03 | 30.07 | 0.204 | 0.973 | 0.041 | 0.25 | 1.47 | 0.41W | 0.007 |
| Invention steel 17 | 0.004 | 0.2 | 0.145 | 0.003 | <0.003 | 0.047 | 28.01 | 0.199 | 0.993 | 0.044 | 0.25 | 2.01 | 0.41W | 0.008 |
| Invention steel 18 | 0.006 | 0.141 | 0.152 | <0.003 | <0.003 | 0.051 | 30.25 | 0.11 | 1.00 | 0.049 | 0.26 | — | 0.39V | 0.011 |
| Invention steel 19 | 0.011 | 0.138 | 0.167 | <0.003 | <0.003 | 0.071 | 30.58 | 0.11 | 0.96 | 0.056 | 0.27 | — | 0.40V | 0.012 |
| Invention steel 20 | 0.006 | 0.118 | 0.151 | <0.003 | <0.003 | 0.049 | 30.20 | 0.11 | 0.97 | 0.051 | 0.26 | — | — | 0.008 |
| Invention steel 21 | 0.005 | 0.136 | 0.150 | <0.003 | <0.003 | 0.034 | 30.16 | 0.12 | 0.96 | 0.051 | 0.25 | 0.98 | 0.40W | 0.009 |
| Invention steel 22 | 0.006 | 0.126 | 0.150 | <0.003 | <0.003 | 0.043 | 30.16 | 0.10 | 0.97 | 0.050 | 0.25 | — | — | 0.009 |
| Invention steel 23 | 0.008 | 0.110 | 0.151 | <0.003 | <0.003 | 0.083 | 30.19 | 0.11 | 0.98 | 0.056 | 0.26 | — | 0.37W | 0.009 |
| Invention steel 24 | 0.004 | 0.124 | 0.121 | <0.003 | <0.003 | 0.037 | 30.10 | 0.12 | — | 0.051 | 0.24 | — | 0.4V | 0.008 |
| Invention steel 25 | 0.005 | 0.113 | 0.143 | <0.003 | <0.003 | 0.035 | 30.11 | 0.11 | — | 0.050 | 0.25 | — | — | 0.009 |
| Invention steel 26 | 0.007 | 0.128 | 0.128 | <0.003 | <0.003 | 0.941 | 30.01 | — | 0.97 | 0.050 | 0.25 | — | 0.4V | 0.009 |
| Invention steel 27 | 0.006 | 0.111 | 0.137 | <0.003 | <0.003 | 0.025 | 30.00 | — | 0.98 | 0.056 | 0.26 | — | — | 0.09 |
| Comparative steel | 0.008 | 0.4 | 0.34 | 0.003< | <0.002 | 0.003 | 19.33 | 0.14 | 0.45 | — | 0.43 | 0.01 | 0.98V | 0.008 |

The inventor measured an initial interfacial contact resistance at a contact pressure of 140N/cm² with respect to each of the steels in Table 1, and measured its interfacial contact resistance after completing chemical surface reforming according to the present invention. The measurement of the interfacial contact resistance will be illustrated in the following description.

In order to observe a change in contact resistance depending on a surface roughness, the inventor prepared stainless steel plates having different surface roughnesses with respect to the invention steel 12 in Table 1 as a representative example and then measured the interfacial contact resistance in the state of a passive film formed in the air.

The measurement of the interfacial contact resistance is measured by the DC 4-terminal method. Two separators are sandwiched between carbon papers (SGL Co., GDL 10-BA), and a copper end plate is mounted together with the carbon papers. Then, a current applying terminal is connected to the copper end plate, and voltage terminals are connected to the respective two separators, thereby measuring a contact resistance according to pressure. In this instance, the measurement of the interfacial contact resistance for each of the slabs was performed four times or more.

Figure 2:
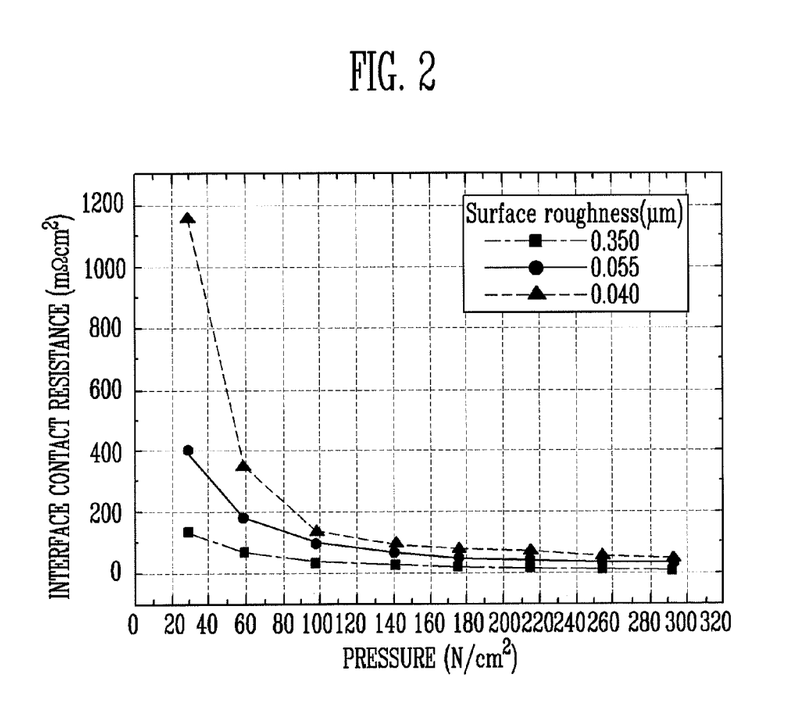
FIG. 2 is a graph showing a change in initial interfacial contact resistance for each surface roughness.

FIG. 2 is a graph showing a change in initial interfacial contact resistance for each surface roughness.

Referring to FIG. 2, the surface contact resistance of a stainless steel is decreased as the mean roughness Ra of a surface of the stainless steel, measured by surface roughness tester, is increased. Although stainless steels have the same kind of steel, they show a considerable difference according to their surface roughnesses. The change in interfacial contact resistance depending on surface roughness has a correlation in that the contact resistance is in proportion to 1/Ra, 1/Rq, 1/Rp, 1/Rt or 1/dp. However, the contact resistances of stainless steels of which mean roughnesses Ra are 0.350, 0.055 and 0.040, respectively, are high in applying the stainless steels as polymer fuel cell separators. When the contact resistance of a stainless steel is generally 10 mΩcm² or less, the stainless steel is suitable for the separator.

That is, such a result means that it is difficult to secure a contact resistance of 10 mΩcm² or less only through the control of the surface roughness. As the result studied by the inventor, it has been found that this is result from a thin protective passive film formed on the surface of the stainless steel. The passive film is formed of a Fe—Cr—based oxide and has a high content of Fe. Since the thickness of the passive film is thick, the contact resistance of the stainless steel is high. The stainless steel having a passive film formed thereon is not suitable to be used as a separator for a polymer fuel cell. Accordingly, the invention has found that the passive film is necessarily removed from the stainless steel. Particularly, it is required to develop a technique for controlling the composition and thickness of a passive film regardless of an initial surface roughness condition.

Thus, in the present invention, a stainless steel having a first passive film formed thereon was pickled in a 10 to 20 wt % sulfuric acid solution at a temperature of 50 to 75° C. under optimum processing conditions while maintaining the following processing time according to surface roughness conditions, thereby removing the first passive film.

Figure 3:
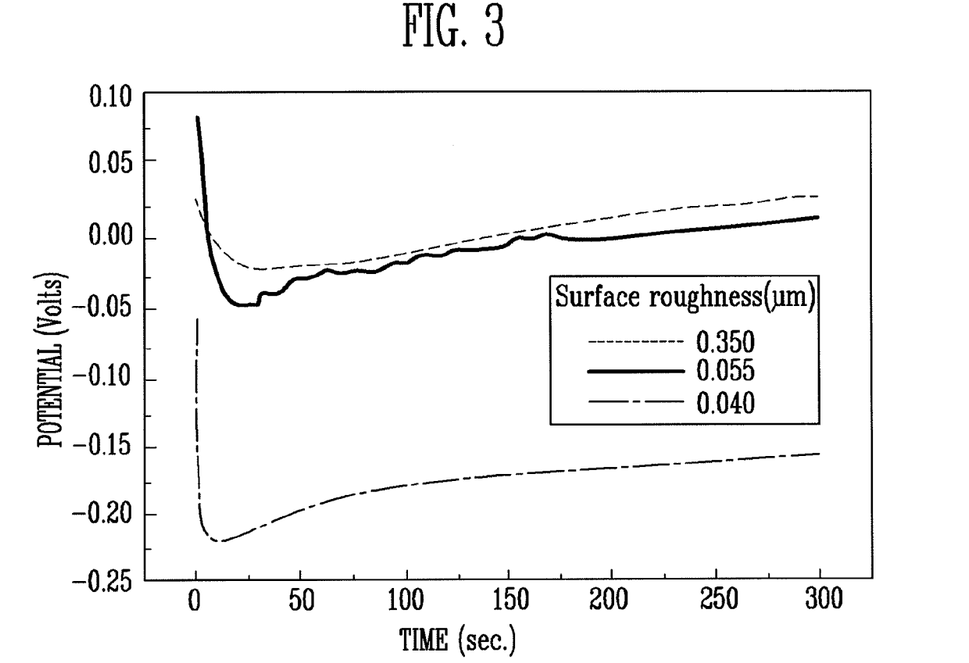
FIG. 3 is a graph showing a change in potential obtained by immersing invention steel 12 in a 15 wt % sulfuric acid solution at 70° C. using a saturated calomel electrode (SCE) electrode as a reference electrode.

FIG. 3 is an embodiment of an optimum pickling condition for each surface roughness according to the present invention. FIG. 3 is a graph showing a change in potential obtained by immersing invention steel 12 in a 15 wt % sulfuric acid solution at 70° C. using a saturated calomel electrode (SCE) electrode as a reference electrode.

As shown in FIG. 3, the potential of the stainless steel in a state that the first passive film is formed on a surface of the invention steel 12 is higher than that in a state that an oxide is not formed on the surface of the invention steel 12. If the first passive film is removed by immersing the first passive film in the sulfuric acid solution, the potential of the stainless steel is rapidly decreased within 25 seconds. This means that the removal of the first passive film composed of an oxide formed on the surface of the stainless steel is started, and as a result, the potential of the stainless steel is gradually decreased within 25 seconds. After a certain period of time elapses, the oxide formed on the surface of the immersed stainless steel is removed, so that the potential of the stainless steel is not decreased any more but saturated. Thus, the stainless steel is immersed in the sulfuric acid solution from the potential lower than that in the initial period of immersion to the saturation time, thereby removing the first passive film (oxide) formed on the surface of the stainless steel.

Through the graph of FIG. 3, it can be seen that the aspect in which stainless steel plate reacts in the sulfuric acid solution is different for each surface roughness condition, and accordingly, the processing condition for removing an oxide in the sulfuric acid solution is also different for each of the surface roughness conditions. Therefore, in the invention steel, the appropriate processing time for removing the first passive film in a 10 to 20 wt % sulfuric acid solution at a temperature of 50 to 75° C. is increased as the surface roughness is increased. The appropriate processing time satisfies the following expression 1.

$$99-3.18(1/Ra) \leq \text{processing time}(t,\text{second}) \leq 153-3.18(1/Ra) \quad (1)$$

In a case where the temperature and concentration of the sulfuric acid solution is extremely low, the oxide formed on the surface is not easily removed. On the contrary, in a case where temperature and concentration of the sulfuric acid solution is extremely high, damage of a base material may be caused. Thus, the temperature of the sulfuric acid solution is limited to 50 to 75° C., and the concentration of the sulfuric acid solution is limited to 10 to 20 wt %. If the processing time is over the aforementioned conditions, it is difficult to remove the passive film with high interfacial contact resistance. If the processing time is below the aforementioned conditions, it is difficult to secure a contact resistance of 10 mΩcm² or less due to the damage of the base material and the formation of the passive film with high interfacial contact resistance.

Then, the stainless steel having the first passive film removed therefrom is water-washed.

A repassivation treating process is performed in a mixture of a 10 to 20 wt % nitric acid and a 1 to 10 wt % fluoric acid at a temperature of 40 to 60° C. while maintaining the processing time according to the surface roughness condition, thereby forming a second passive film on the surface of the stainless steel.

Figure 4:
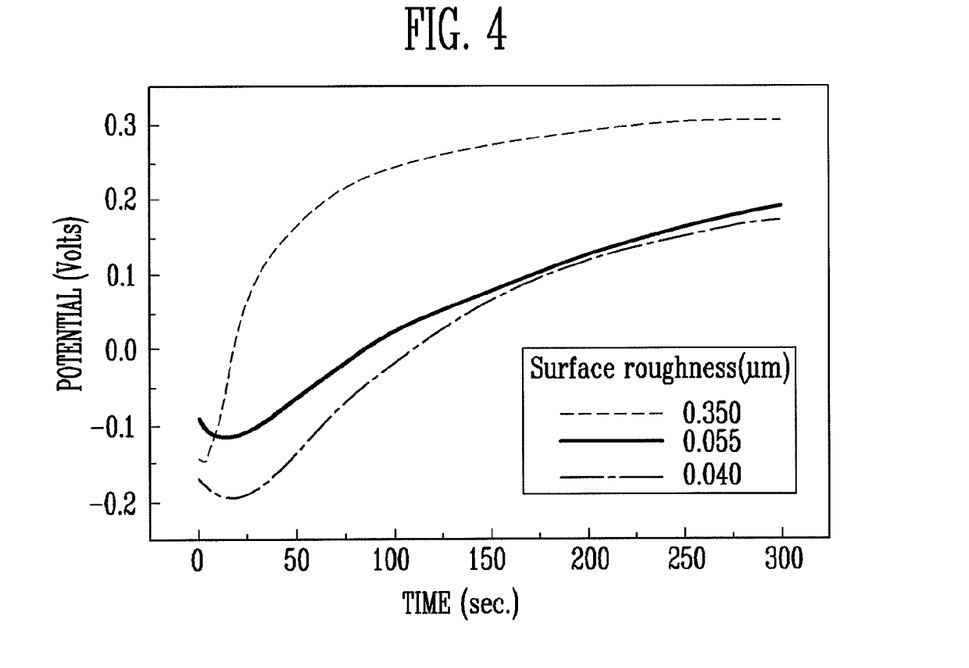
FIG. 4 is a graph showing a change in potential when washing the stainless steel that goes through FIG. 3 and then immersing the invention steel 12 in the mixture of a nitric acid of 15 wt % and a fluorine acid of 5 wt % using the SCE electrode as a reference electrode.

FIG. 4 is an embodiment in which an optimum second passive film is formed for each surface roughness. FIG. 4 is a graph showing a change in potential when washing the stainless steel that goes through FIG. 3 and then immersing the invention steel 12 in a mixture of a nitric acid of 15 wt % and a fluorine acid of 5 wt % using the SCE electrode as a reference electrode.

Referring to FIG. 4, slabs with different surface roughness conditions are water-washed by applying the optimum immersion condition of the sulfuric acid solution, derived from FIG. 3, and the second passive film is formed on the surface of the stainless steel in the mixture of the nitric acid of 15 wt % and the fluorine acid of 5 wt %.

In a case where the stainless steel is immersed in an oxidizing acid such as the mixture of the nitric acid and the fluoric acid, a passive film is formed on the surface of the stainless steel. If the passive film is formed on the surface of the stainless steel, the potential of the stainless steel is increased as time elapses. As described above, if the stainless steel according to the present invention is immersed in the mixture of the nitric acid and the fluoric acid from the potential higher than that in the initial period of immersion to the saturation, the second passive film is formed on the surface of the stainless steel.

In this process, the inventor has found that it takes much time to perform passivation treatment as the temperature of the passivation treatment is decreased, and it is harmful to contact resistance and corrosion resistance due to surface damage as the temperature of the passivation treatment is increased. Thus, in the second passivation treatment, the second passive film is preferably formed in a mixture of a 10 to 20 wt % nitric acid and a 1 to 10 wt % fluoric acid at a temperature of 40 to 60° C. The inventor has also found that the second passive film is necessarily formed differently depending on the surface roughness condition, and it is possible to prepare a separator having characteristics in which the processing time is decreased as the surface roughness is increased and the contact resistance is low at the following processing time t. The preferred processing time satisfies the following expression 2.

$$120+6.73(1/Ra) \leq \text{processing time}(t, \text{second}) \leq 140+6.73(1/Ra) \quad (2)$$

In the present invention, the concentration of the nitric acid is limited to 10 to 20 wt %. In a case where the concentration of the nitric acid is less than 10 wt %, it is difficult to perform the passive treatment. In a case where the concentration of the nitric acid is extremely high, there is no effect of reduction in contact resistance.

In the present invention, the concentration of the fluoric acid is limited to 1 to 10 wt %. In a case where the concentration of the fluoric acid is less than 1 wt %, the passive film may be unstable. On the contrary, in a case where the fluoric acid is excessively added to the stainless steel, it is harmful to contact resistance and corrosion resistance due to surface damage. In the present invention, the inventor has found that when the processing time is deviated from an appropriate time for each of the surface roughnesses, the passive film is unstable or the thickness of the passive film is excessively increased, and therefore, the contact resistance is increased.

Accordingly, the stainless steel according to the present invention can secure the initial contact resistance of 10 mΩcm$^2$ or less and the contact resistance after performing a corrosion test under environmental conditions of the fuel cell. Particularly, in the corrosion resistance when chemical surface reforming treatment is performed on these invention steels, the corrosion current density of the stainless steel is low, and the elution resistance of the stainless steel is excellent. The corrosion resistance will be described later in Table 3.

Figure 5:
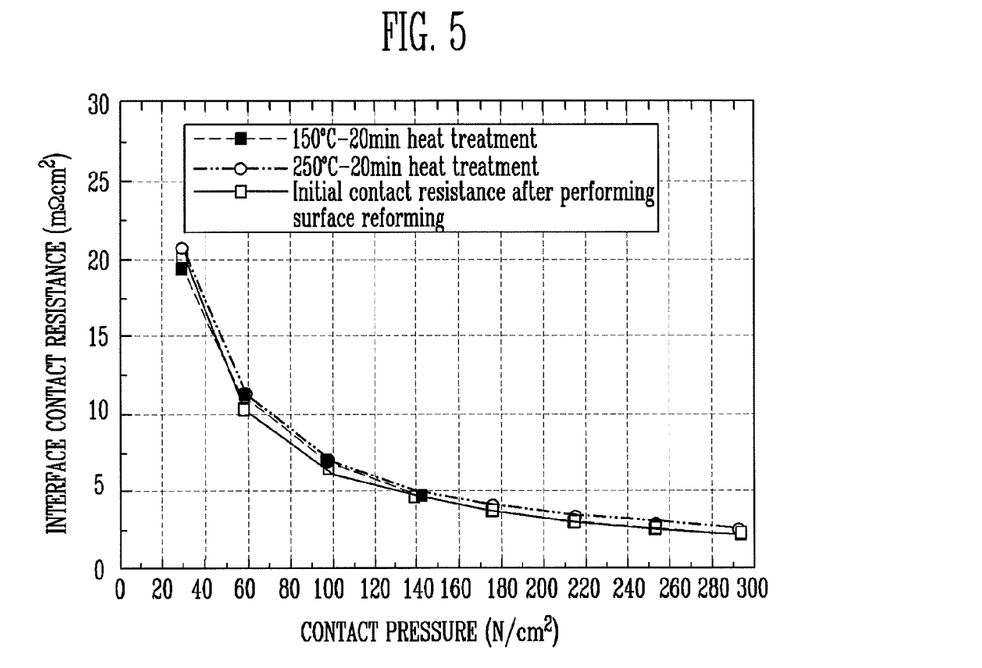
FIG. 5 is a graph showing a change in contact resistance when heat-treating a stainless steel subjected to surface reforming treatment under an air atmosphere.

In the process of preparing a real fuel cell separator, the separator can be exposed up to 250 degrees in the bonding process of a sealing portion, and the temperature of the separator is increased by heat generated in separator welding such as laser welding. As a high-temperature electrolyte has recently been developed, the operating temperature is increased up to 150° C. Thus, in a case where the surface reforming treatment is performed on the invention steel under the development condition, the stability of contact resistance is observed. As a result, all the invention steels can secure the contact resistance of 10 mΩcm$^2$ or less. An example of the invention steel 18 is shown in FIG. 5.

As an embodiment of the present invention, table 2 shows a change in interfacial contact resistance according to each processing time for each surface roughness condition of the invention steel 12.

TABLE 2

| Ra | Processing time (second) of 15 wt % sulfuric acid | Processing time (second) of 15 wt % nitric acid + 5 wt % fluoric acid | Contact resistance (mΩcm$^2$) at pressure of 140N/cm$^2$ | Remark |
| --- | --- | --- | --- | --- |
| 0.350 | 0 | 0 | 28.26 | Comparative example |
|  | 100 | 150 | 3.89 | Invention example |
| 0.055 | 0 | 0 | 75.37 | Comparative example |
|  | 0 | 250 | 22.51 | Comparative example |
|  | 30 | 250 | 15.01 | Comparative example |
|  | 60 | 250 | 3.94 | Invention example |
|  | 90 | 250 | 8.72 | Invention example |
| 0.040 | 0 | 0 | 102.44 | Comparative example |
|  | 30 | 300 | 3.89 | Invention example |

As shown in Table 2, when the mean surface roughness Ra is 0.055, the contact resistance is changed by constantly maintaining the processing time of the mixture of the nitric acid and the fluorine acid and modifying the process of sulfuric acid pickling. Accordingly, the inventor has found that the process of sulfuric acid pickling has great influence on the contact resistance. As the processing time is long or short, the contact resistance is increased. Thus, the inventor has found that the processing time for each surface roughness condition has important influence on the contact resistance.

For each of the steels in Table 1, the inventor performed a pickling process of a first passive film in a 10 to 20 wt % sulfuric acid solution at a temperature of 50 to 75° C. for an appropriate processing time [99−3.18(1/Ra)≤processing time (t, second)≤153−3.18(1/Ra)] and then performed a water-washing process. Then, the inventor performed a forming process of a second passive film in the mixture of a 10 to 20 wt % nitric acid and a 1 to 10 wt % fluoric acid at a temperature of 40 to 60° C. for an appropriate time [120+6.73(1/Ra)≤processing time (t, second)≤140+6.73(1/Ra)]. Table 3 shows results for a contact resistance measured in the aforementioned process, a corrosion current density after performing a condition similar to a cathode atmosphere condition in the atmosphere of the polymer fuel cell, i.e., a potentiostatic polarization test, a contact resistance after performing the potentiostatic polarization test, and a corrosion-resistance experiment with respect to each of the invention steels. Here, the potentiostatic polarization test is performed by applying a voltage of 0.6V for 9 hours using an SCE as a reference electrode while bubbling air in a mixed solution of a sulfuric acid of 1 M and a fluorine acid of 2 ppm at a temperature of 70° C. The corrosion-resistance experiment is performed by measuring Fe, Cr and Ni elution ions in a corrosion solution using an inductively coupled plasma spectroscopy (ICP).

TABLE 3

| Kind of steel | Contact resistance (mΩcm$^2$) at 140 N/cm$^2$ after chemical surface reforming | Contact resistance (mΩcm$^2$) at 140 N/cm$^2$ after heat treatment in air atmosphere of 200 degrees for 20 minutes | Corrosion current density (μA/cm$^2$) | Interfacial contact resistance (mΩcm$^2$) at 140N/cm$^2$ after polarization experiment | Elution ion concentration (mg/L) after polarization experiment | | |
|---|---|---|---|---|---|---|---|
| | | | | | Fe | Cr | Ni |
| Invention steel 1 | 5.17 | 5.40 | 0.08 | 5.84 | 0.023 | No | No |
| Invention steel 2 | 4.32 | 5.1 | 0.02 | 4.92 | 0.033 | No | No |
| Invention steel 3 | 4.09 | 4.30 | 0.07 | 4.71 | 0.024 | No | No |
| Invention steel 4 | 4.35 | 4.55 | 0.03 | 4.52 | 0.017 | No | No |
| Invention steel 5 | 4.16 | 4.20 | 0.02 | 4.10 | 0.021 | No | No |
| Invention steel 6 | 4.16 | 4.30 | 0.02 | 5.66 | 0.025 | No | No |
| Invention steel 7 | 3.70 | 4.55 | 0.04 | 4.99 | 0.018 | No | No |
| Invention steel 8 | 3.77 | 4.54 | 0.09 | 4.78 | 0.017 | No | No |
| Invention steel 9 | 3.89 | 4.12 | 0.08 | 4.28 | 0.016 | No | No |
| Invention steel 10 | 3.74 | 4.31 | 0.03 | 4.23 | 0.019 | No | No |
| Invention steel 11 | 3.87 | 4.55 | 0.03 | 4.38 | 0.027 | No | No |
| Invention steel 12 | 5.84 | 5.90 | 0.10 | 5.56 | 0.021 | No | No |
| Invention steel 13 | 4.06 | 5.10 | 0.12 | 8.52 | 0.024 | No | No |
| Invention steel 14 | 4.25 | 4.95 | 0.09 | 5.68 | 0.040 | No | No |
| Invention steel 15 | 4.45 | 5.12 | 0.12 | 5.58 | 0.045 | No | No |
| Invention steel 16 | 5.33 | 5.78 | 0.12 | 6.07 | 0.049 | No | No |
| Invention steel 17 | 5.64 | 5.99 | 0.12 | 6,87 | 0.031 | No | No |
| Invention steel 18 | 4.67 | 4.78 | 0.04 | 5.56 | 0.021 | No | No |
| Invention steel 19 | 5.82 | 5.97 | 0.08 | 6.52 | 0.022 | No | No |
| Invention steel 20 | 4.25 | 4.32 | 0.09 | 6.05 | 0.020 | No | No |
| Invention steel 21 | 4.50 | 5.12 | 0.03 | 7.10 | 0.017 | No | No |
| Invention steel 22 | 5.12 | 5.78 | 0.06 | 5.45 | 0.023 | No | No |
| Invention steel 23 | 5.75 | 5.90 | 0.04 | 6.10 | 0.027 | No | No |
| Invention steel 24 | 4.35 | 4.44 | 0.03 | 5.78 | 0.017 | No | No |
| Invention steel 25 | 4.67 | 4.78 | 0.02 | 5.99 | 0.020 | No | No |
| Invention steel 26 | 4.89 | 5.12 | 0.05 | 6.00 | 0.019 | No | No |
| Invention steel 27 | 5.01 | 5.09 | 0.03 | 5.79 | 0.021 | No | No |
| Comparative steel | 8.5 | 25.78 | 0.16 | 5 | 2.135 | 0.505 | 0.005 |

As shown in Table 3, the contact resistance of the stainless steel for the separator according to the embodiment of the present invention, obtained by exposing an invention steel subjected to chemical surface reforming treatment at a temperature of 200° C. for 20 minutes under an air atmosphere, is measured at a contact pressure of 140N/cm$^2$. As a result, the stainless steel has a low contact resistance of 10 mΩcm$^2$ as compared with the comparative steel. The contact resistance measured after performing the polarization experiment is lower than that of the comparative steel. The corrosion current density measured after performing the polarization experiment also has a low value of 0.12 μA/cm$^2$. As the result obtained by measuring elution ions, only Fe elution ions of 0.05 mg/L or less are detected in the stainless steel as compared with the comparative steel. Particularly, although Mo was used as an essential element in the conventional patent, the invention steel to which the Mo is not added shows excellent contact resistance and elution resistance in the present invention. As an example, it can be seen that the invention steels 18, 19, 20, 22 and 23 have excellent contact resistance and corrosion resistance in the present invention.

According to the embodiment of the present invention, an X-ray photoelectron microscopy (XPS) analysis is performed on the second passive film obtained by performing two-step chemical surface reforming under the aforementioned surface roughness condition and then performing the potentiostatic polarization test.

Figure 6A:
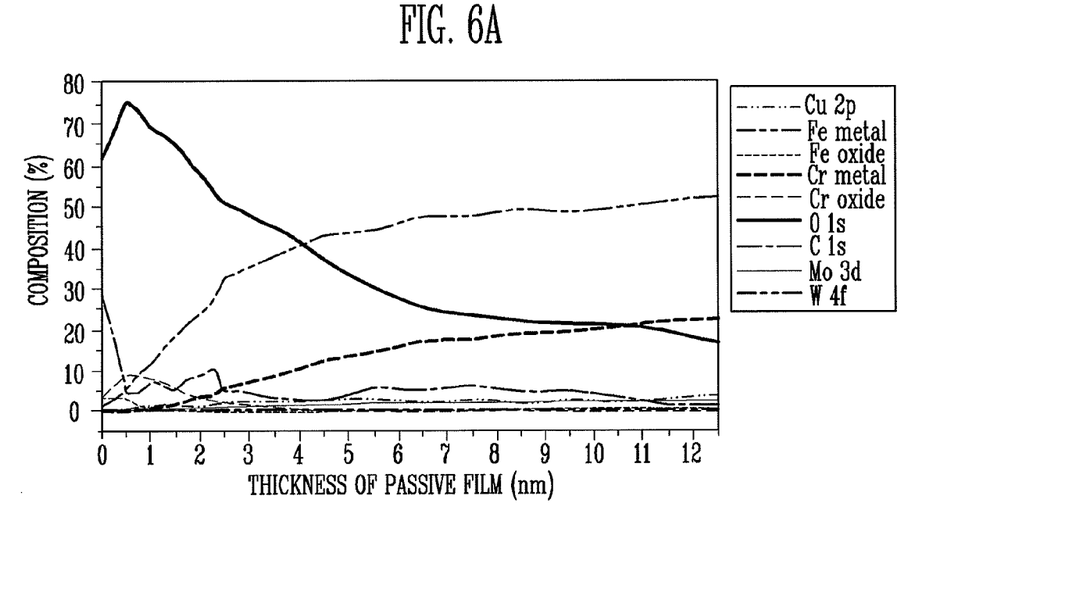
FIGS. 6A to 6C are graphs showing examples of performing an X-ray photoelectron microscopy analysis on composition distributions of first and second passive films in an initial period, after performing a surface reforming treatment and after performing a potentiostatic polarization test according to embodiments of Table 2.
Figure 6B:
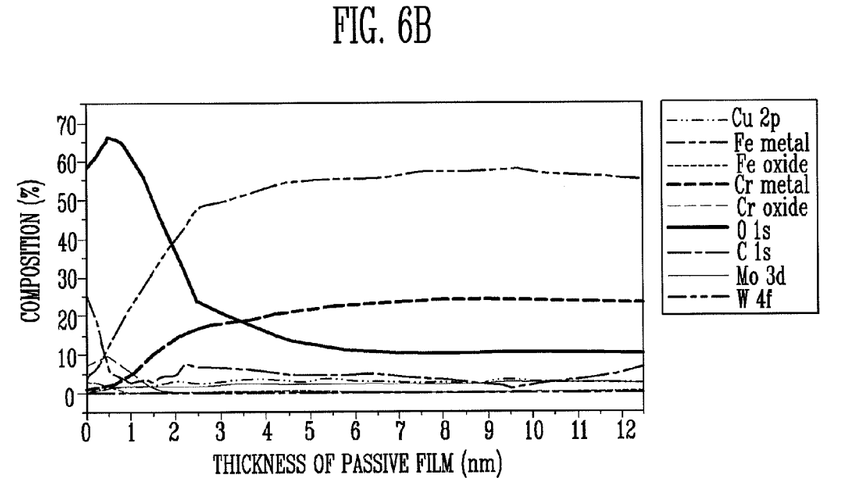
Figure 6C:
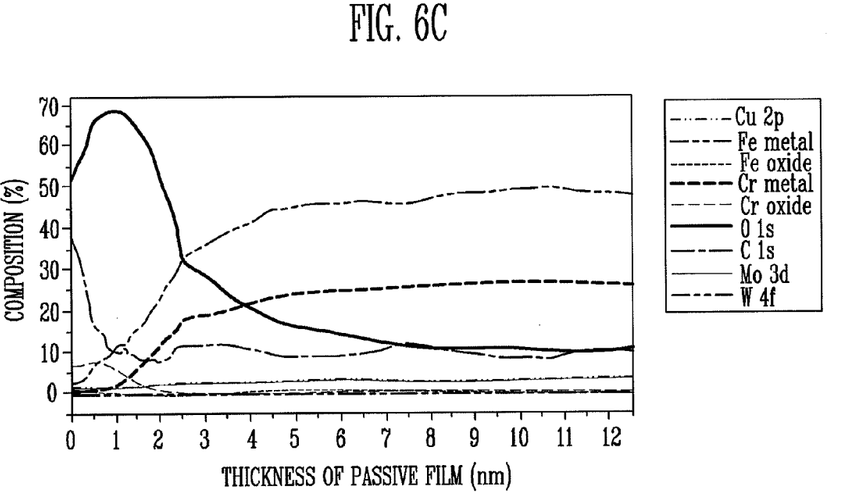

FIGS. 6A to 6C are graphs showing examples of performing an X-ray photoelectron microscopy analysis on composition distributions of first and second passive films in an initial period, after performing a surface reforming treatment and after performing a potentiostatic polarization test according to embodiments of Table 2.

Referring to FIGS. 6A to 6C, the thickness of the initial first passive film is about 5.5 nm, and the thickness of the second passive film produced after performing the two-step chemical surface reforming is about 2.2 nm. It can be seen that the thickness of the second passive film after performing the potentiostatic polarization test is about 2.3 nm, which is hardly different from the thickness of the second passive film produced after performing the two-step chemical surface reforming. Particularly, the thickness of the second passive film after performing the chemical surface reforming on the invention steel in Table 3 was measured within the range from 2 to 3.5 nm.

Figure 7A:
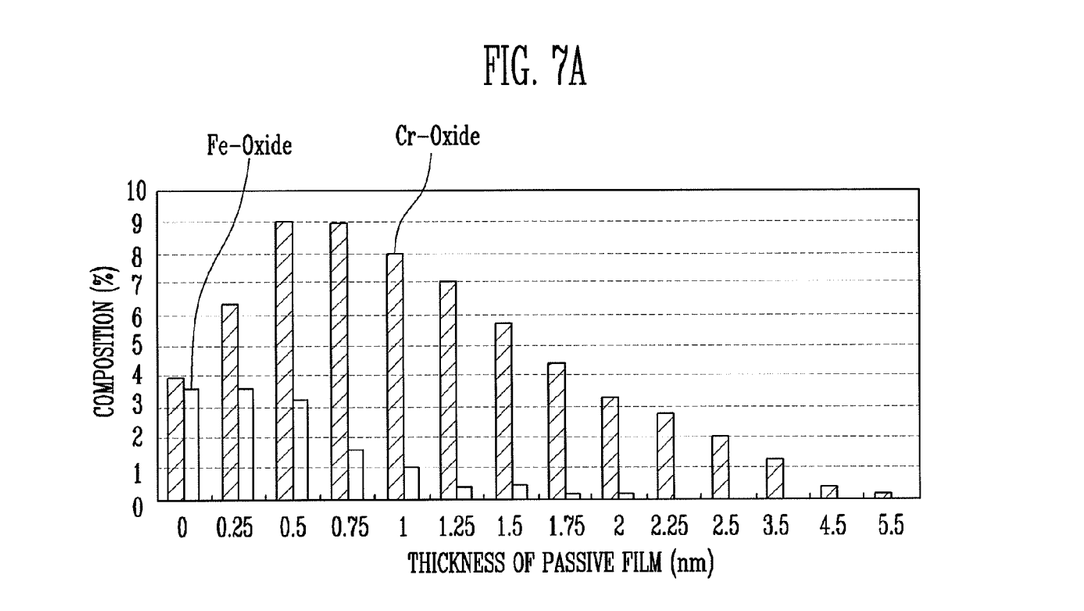
FIGS. 7A to 7C are graphs showing Cr/Fe oxide distributions in the first and second passive films in the initial period, after performing the surface reforming treatment and after performing the potentiostatic polarization test according to the embodiments of Table 2.
Figure 7B:
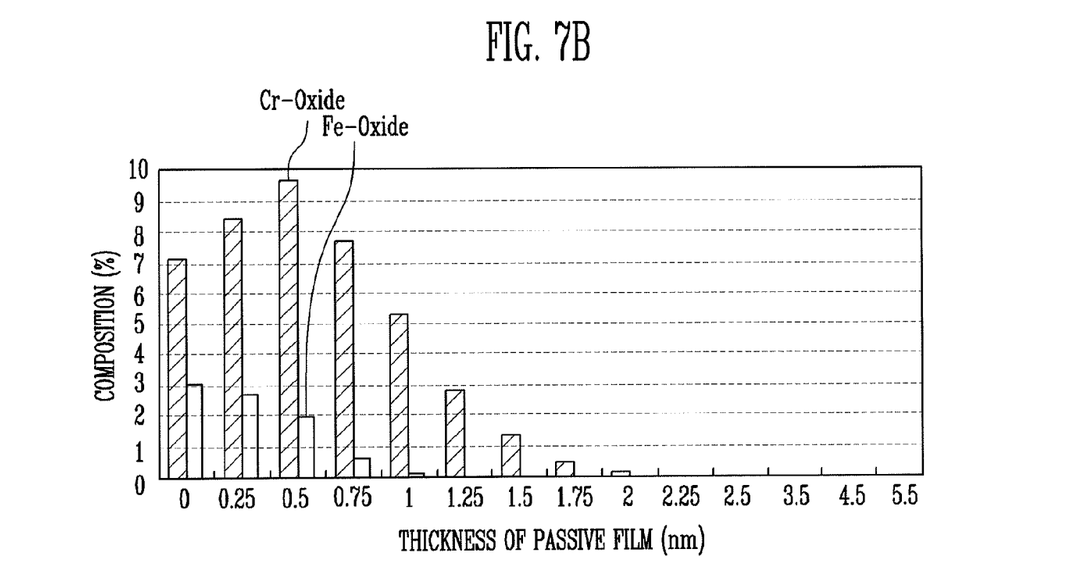
Figure 7C:
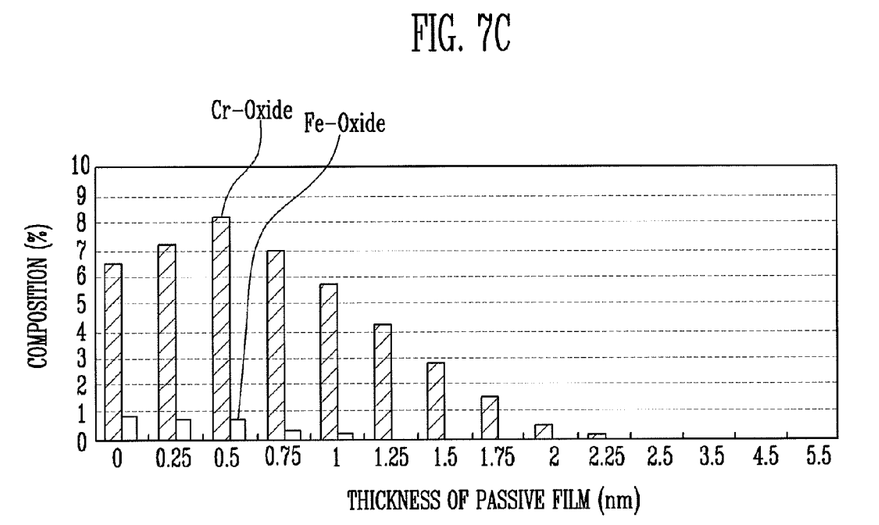

FIGS. 7A to 7C are graphs showing Cr/Fe oxide distributions in the first and second passive films in the initial period, after performing the surface reforming treatment and after performing the potentiostatic polarization test according to the embodiments of Table 2.

Referring to FIGS. 7A to 7C, it can be seen that in addition to a decrease in thickness, the Cr/Fe oxide ratio in the second passive film after performing a surface reforming treatment and then performing a potentiostatic polarization test secures 1.5 or more in a region of 1 nm, as compared with the Cr/Fe oxide ratio in the initial first passive film. Particularly, it can be seen that the Cr/Fe oxide ratio after performing the chemical surface reforming on the invention steel in Table 3 secures 1.5 or more in a region of less than 1.5 nm.

Figure 8:
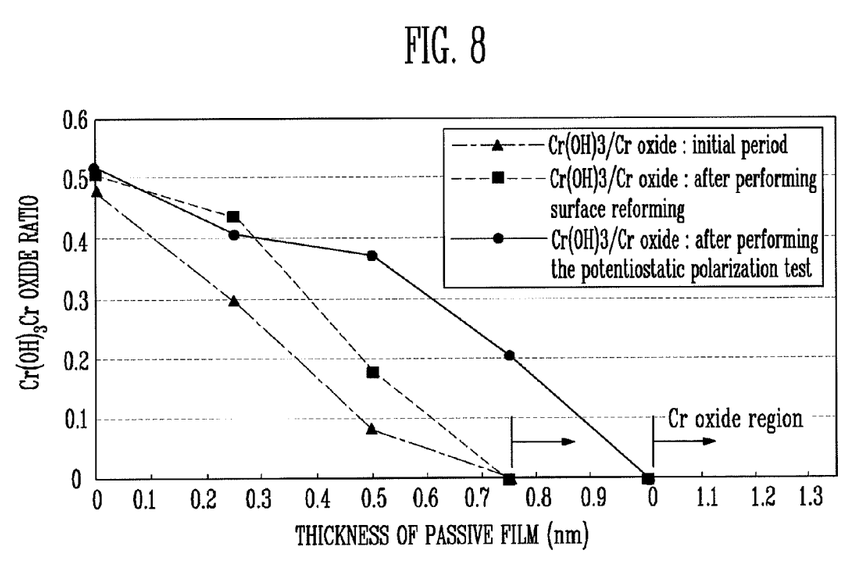
FIG. 8 is a graph showing a $Cr(OH)_3$/Cr oxide distribution in the first and second passive films in the initial period, after performing the surface reforming treatment and after performing the potentiostatic polarization test according to the embodiments of Table 2.

FIG. 8 is a graph showing a $Cr(OH)_3$/Cr oxide distribution in the first and second passive films in the initial period, after performing the surface reforming treatment and after performing the potentiostatic polarization test according to the embodiments of Table 2.

As shown in FIG. 8, it can be seen that the $Cr(OH)_3$/Cr oxide distribution in the second passive film after performing the two-step surface reforming and then performing the potentiostatic polarization test has a ratio of 0 to 0.52 in a region of less than 1 nm as compared with the $Cr(OH)_3$/Cr oxide ratio of the initial first air-formed film within a region in which the thickness of the passive film is less than 1 nm. Particularly, it can be seen that the $Cr(OH)_3$/Cr oxide distribution after performing the two-step chemical surface reforming on the invention steel in Table 3 has a ratio of 0 to 0.7 in a region of less than 1 nm.

From the aforementioned experiment, it can be seen that the initial surface roughness acts as a primary factor for setting conditions such as processing time in the two-step surface reforming including a pickling process of removing the first passive film in the sulfuric acid solution of the stainless steel with the composition range of the present invention and a passivation treatment process of forming the second passive film in the mixed solution of the nitric acid and the fluorine acid after water-washing. The thickness of the second passive film of the stainless steel processed by the two-step chemical surface reforming is formed in the range from 2 to 4.5 nm. Further, it can be seen that the Cr/Fe oxide ratio is 1.5 or more in a region of less than 1.5 nm, and it is possible to ensure a stainless steel having excellent contact resistance and corrosion resistance when the $Cr(OH)_3$/Cr oxide distribution has a ratio of 0 to 0.7 in a region of less than 1 nm.

Figure 9A:
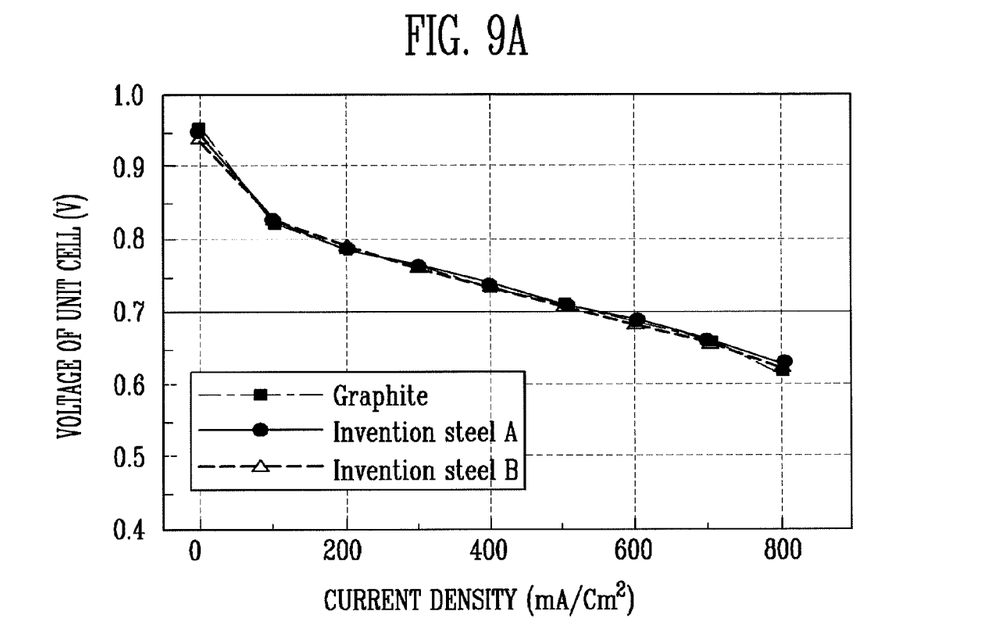
FIGS. 9A to 9C are graphs showing performance estimation results measured by preparing stainless separators formed by performing an optimum two-step surface reforming treatment on invention steels 9 and 12 in Table 3 and then assembling the prepared stainless separator in a polymer fuel cell unit cell.
Figure 9B:
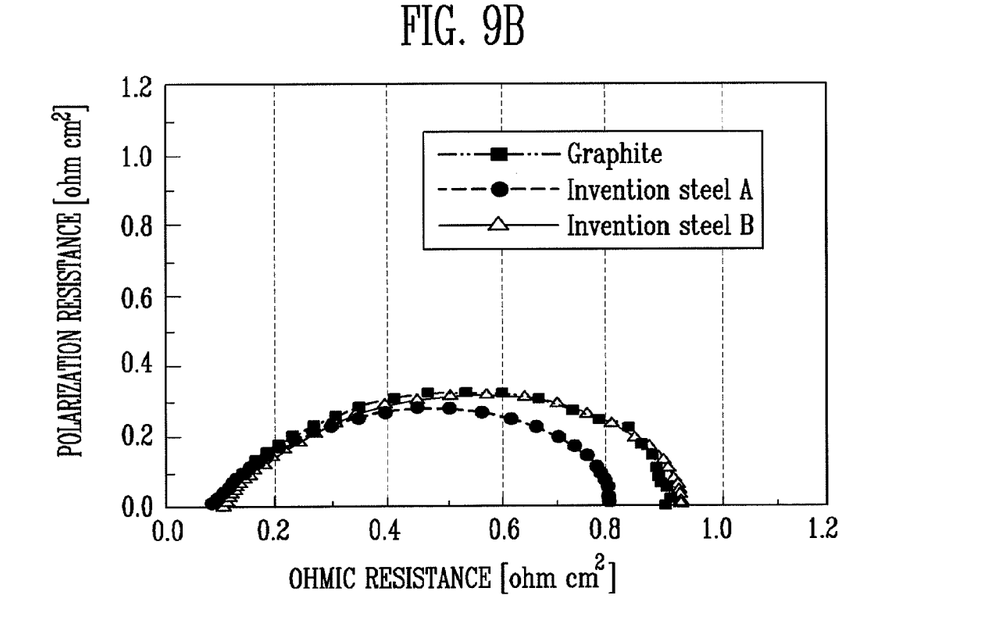
Figure 9C:
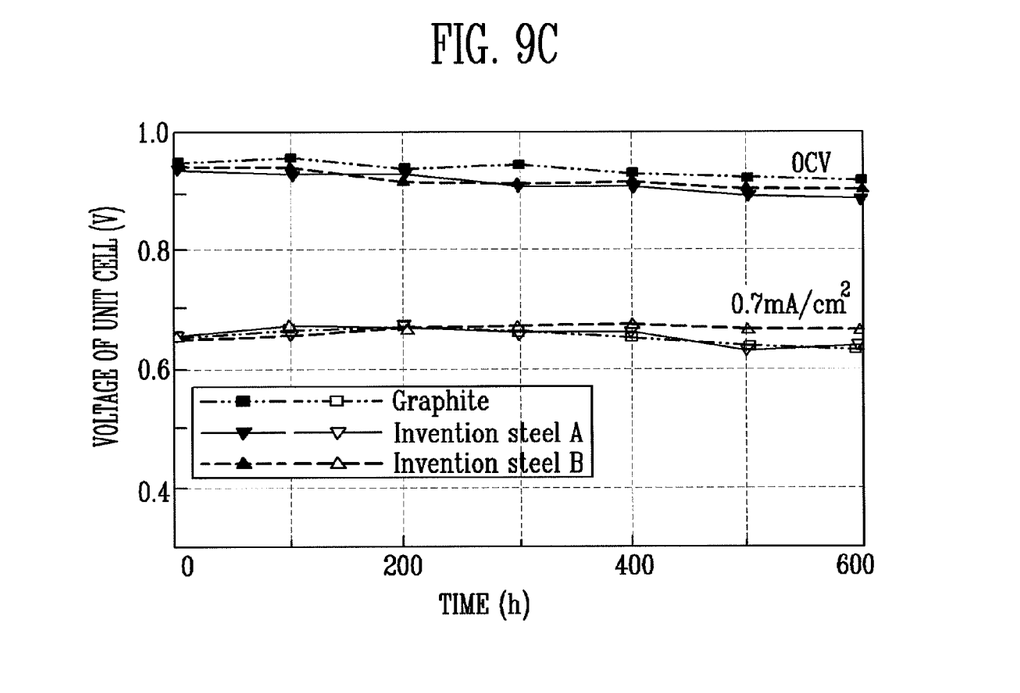

FIGS. 9A to 9C are graphs showing performance estimation results measured by preparing stainless separators formed by performing an optimum two-step surface reforming treatment on invention steels 9 and 12 in Table 3 and then assembling the prepared stainless separator in a polymer fuel cell unit cell.

Referring to FIGS. 9A to 9C, the operating temperature of the fuel cell was maintained as 70, and the entire pressure of reactive gas was maintained as 1 atmospheric pressure. The amounts of hydrogen and oxygen supplied to an anode and a cathode were measured by supplying 1.5 of the amount of electrochemically consumed hydrogen and 2 of the amount of electrochemically consumed oxygen, respectively. A membrane electrode assembly (produced by Gore Co.) was used as the used membrane electrode assembly was used. In the long-term measurement, the voltage of a unit cell was measured under a standard condition while maintaining the current density to $0.7$ $mA/cm^2$ (17.5 A).

As shown in FIG. 9A, the initial performance shows a performance result almost similar to that of a graphite material. As shown in FIG. 9B, the ohmic resistance and the polarization resistance are almost similar to or partially lower than those of the graphite material in the impedance analysis result. Referring to FIG. 9C, in terms of the long-term performance measured for 600 hours, the open circuit voltage (OCV) is maintained constant, and the voltage drop at a constant current density of $0.7$ $mA/cm^2$ (17.5 A) is identical to or partially higher than that of the graphite material.

That is, according to the embodiments of the invention steel, surface reforming conditions are set so that it is possible to control the removal of the passive film of the stainless steel and the repassivation treatment of the stainless steel. Thus, the stainless steel can secure low interfacial contact resistance and achieve excellent corrosion resistance with reduced elution resistance. Accordingly, it is possible to produce a stainless steel having excellent long-term performance of the polymer fuel cell.

In the aforementioned embodiment, the polymer fuel cell separator has been illustrated as an example. However, it will be apparent that the present invention may be applied to other various fuel cell separators.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A preparation method of a stainless steel for a polymer fuel cell separator, comprising C: 0.02 wt % or less, N: 0.02 wt % or less, Si: 0.4 wt % or less, Mn: 0.2 wt % or less, P: 0.04 wt % or less, S: 0.02 wt % or less, Cr: 25.0 to 32.0 wt %, Cu: 0 to 2.0 wt %, Ni: 0.8 wt % or less, Ti: 0.5 wt % or less, Nb: 0.5 wt % or less, waste Fe and inevitably contained elements, in which a second passive film is formed on a surface of the stainless steel, the method comprising:

forming a first passive film on the surface of the stainless steel by bright-annealing or annealing-pickling the stainless steel;

removing the first passive film by pickling the stainless steel in a 10 to 20 wt % sulfuric acid solution at a temperature of 50 to 75° C. for a first processing time controlled based on a surface roughness Ra of the stainless steel, wherein the first processing time is increased as the surface roughness Ra is increased;

water-washing the stainless steel; and forming the second passive film by performing a passivation treatment on the stainless steel in the mixture of a 10 to 20 wt % nitric acid and a 1 to 10 wt % fluorine acid at a temperature of 40 to 60° C. for a second processing time controlled based on the surface roughness Ra, wherein, in the forming of the second passive film, the second processing time is controlled according to the following expression:

$$120+6.73(1/Ra) \leq \text{second processing time(second)} \leq 140+6.73(1/Ra).$$

2. The method of claim 1, wherein the stainless steel is a ferrite stainless steel further comprising Mo: 5.0 wt % or less.

3. The method of claim 1, wherein the stainless steel further comprises one or two or more elements selected from the group consisting of V: 0.1 to 1.5 wt %, W: 0.1 to 2.0 wt %, La: 0.0005 to 1.0 wt %, Zr: 0.0005 to 1.0 wt % and B: 0.0005 to 1.0 wt %.

4. The method of claim 1, wherein, in the forming of the second passive film, the second passive film is formed to have a thickness of 2 to 4.5 nm.

5. The method of claim 1, wherein, in the forming of the second passive film, the Cr/Fe oxide ratio of the second passive film is 1.5 or more in a region of 1.5 nm or less.

6. The method of claim 1, wherein, in the forming of the second passive film, the $Cr(OH)_3$/Cr oxide distribution of the second passive film has a ratio of 0 to 0.7 in a region of 1 nm.

7. The method of claim 1, wherein the removing of the first passive film, the water-washing and the forming of the second passive film are performed on a steel plate after the bright-annealing or annealing-pickling of the stainless steel.

8. The method of claim 1, wherein the removing of the first passive film, the water-washing and the forming of the second passive film are performed just before forming a flow path of the separator after the bright-annealing or annealing-pickling of the stainless steel.

9. The method of claim 1, wherein the removing of the first passive film, the water-washing and the forming of the second passive film are performed just after forming a flow path of the separator after the bright-annealing or annealing-pickling of the stainless steel.

10. The method of claim 1, wherein the contact resistance of the stainless steel is 10 m$\Omega$cm$^2$ or less under an operating environment of 60 to 150° C.

11. A preparation method of a stainless steel for a polymer fuel cell separator, comprising C: 0.02 wt % or less, N: 0.02 wt % or less, Si: 0.4 wt % or less, Mn: 0.2 wt % or less, P: 0.04 wt % or less, S: 0.02 wt % or less, Cr: 25.0 to 32.0 wt %, Cu: 0 to 2.0 wt %, Ni: 0.8 wt % or less, Ti: 0.5 wt % or less, Nb: 0.5 wt % or less, waste Fe and inevitably contained elements, in which a second passive film is formed on a surface of the stainless steel, the method comprising:

forming a first passive film on the surface of the stainless steel by bright-annealing or annealing-pickling the stainless steel;

removing the first passive film by pickling the stainless steel in a 10 to 20 wt % sulfuric acid solution at a temperature of 50 to 75° C. for a first processing time controlled based on a surface roughness Ra of the stainless steel, wherein the first processing time is increased as the surface roughness Ra is increased;

water-washing the stainless steel; and forming the second passive film by performing a passivation treatment on the stainless steel in the mixture of a 10 to 20 wt % nitric acid and a 1 to 10 wt % fluorine acid at a temperature of 40 to 60° C. for a second processing time controlled based on the surface roughness Ra, wherein, the first processing time is controlled according to the following expression:

$$99-3.18(1/Ra) \leq \text{first processing time(second)} \leq 153-3.18(1/Ra).$$

12. The method of claim 11, wherein the stainless steel is a ferrite stainless steel further comprising Mo: 5.0 wt % or less.

13. The method of claim 11, wherein the stainless steel further comprises one or two or more elements selected from the group consisting of V: 0.1 to 1.5 wt %, W: 0.1 to 2.0 wt %, La: 0.0005 to 1.0 wt %, Zr: 0.0005 to 1.0 wt % and B: 0.0005 to 1.0 wt %.

14. The method of claim 11, wherein, in the forming of the second passive film, the second passive film is formed to have a thickness of 2 to 4.5 nm.

15. The method of claim 11, wherein, in the forming of the second passive film, the Cr/Fe oxide ratio of the second passive film is 1.5 or more in a region of 1.5 nm or less.

16. The method of claim 11, wherein, in the forming of the second passive film, the $Cr(OH)_3$/Cr oxide distribution of the second passive film has a ratio of 0 to 0.7 in a region of 1 nm.

17. The method of claim 11, wherein the removing of the first passive film, the water-washing and the forming of the second passive film are performed on a steel plate after the bright-annealing or annealing-pickling of the stainless steel.

18. The method of claim 11, wherein the removing of the first passive film, the water-washing and the forming of the second passive film are performed just before forming a flow path of the separator after the bright-annealing or annealing-pickling of the stainless steel.

19. The method of claim 11, wherein the removing of the first passive film, the water-washing and the forming of the second passive film are performed just after forming a flow path of the separator after the bright-annealing or annealing-pickling of the stainless steel.

20. The method of claim 11, wherein the contact resistance of the stainless steel is 10 m$\Omega$cm$^2$ or less under an operating environment of 60 to 150° C.

* * * * *